US012770233B2

(12) United States Patent
Yang et al.

(10) Patent No.: US 12,770,233 B2
(45) Date of Patent: Oct. 20, 2026

(54) MULTIPHASE FLOW DISPERSED PHASE IDENTIFICATION AND COMPLETION METHOD BASED ON A SAM NEURAL NETWORK

(71) Applicants: Institute of Process Engineering, Chinese Academy of Sciences, Beijing (CN); Nanjing Jiuzhang Chemical Technology Co., Ltd, Nanjing (CN)

(72) Inventors: Chao Yang, Beijing (CN); Xin Feng, Beijing (CN); Haohan Xu, Beijing (CN); Xiaoxia Duan, Beijing (CN); Jie Chen, Beijing (CN); Weipeng Zhang, Beijing (CN)

(73) Assignees: INSTITUTE OF PROCESS ENGINEERING, CHINESE ACADEMY OF SCIENCES, Beijing (CN); NANJING JIUZHANG CHEMICAL TECHNOLOGY CO., LTD., Nanjing (CN)

( * ) Notice: Subject to any disclaimer, the term of this patent is extended or adjusted under 35 U.S.C. 154(b) by 0 days.

(21) Appl. No.: 19/169,133

(22) Filed: Apr. 3, 2025

(65) Prior Publication Data

US 2026/0044941 A1 Feb. 12, 2026

(30) Foreign Application Priority Data

May 10, 2024 (CN) ........................ 202410573382.0

(51) Int. Cl.
*G06T 5/70* (2024.01)
*G06T 7/11* (2017.01)

(52) U.S. Cl.
CPC .................. *G06T 5/70* (2024.01); *G06T 7/11* (2017.01); *G06T 2207/20084* (2013.01)

(58) Field of Classification Search
CPC ..... G06T 5/70; G06T 7/11; G06T 7/12; G06T 7/194; G06T 5/60; G06T 2207/20024
See application file for complete search history.

(56) References Cited

U.S. PATENT DOCUMENTS

2024/0156547 A1* 5/2024 Luengo Muntion ... A61B 34/25

FOREIGN PATENT DOCUMENTS

CN 104657964 5/2015
CN 110415257 11/2019
(Continued)

OTHER PUBLICATIONS

Bueno et al.: "Two-phase flow bubble detection method applied to natural circulation system using fuzzy Image processing", Nuclear Engineering and Design 335 (2018), pp. 255-264.
(Continued)

*Primary Examiner* — Gregory A Morse
*Assistant Examiner* — Conor A O'Malley
(74) *Attorney, Agent, or Firm* — Woodard, Emhardt, Henry, Reeves & Wagner, LLP

(57) ABSTRACT

A multiphase flow dispersed phase identification and completion method includes preprocessing an image to filter out noise and a non-key frequency component; identifying and segmenting the preprocessed image by using a SAM neural network to obtain a segmentation mask; post-processing the segmentation mask to output a precise bubble mask; and reconstructing the shape of a bubble by using a bubble reconstruction algorithm.

6 Claims, 1 Drawing Sheet

(56) References Cited

FOREIGN PATENT DOCUMENTS

| | | |
|---|---|---|
| CN | 110866874 | 3/2020 |
| CN | 117370878 | 1/2024 |
| CN | 117454063 | 1/2024 |
| CN | 117787087 | 3/2024 |
| CN | 117974936 | 5/2024 |
| WO | WO 2015110599 | 7/2015 |

OTHER PUBLICATIONS

Office Action in related CN202410573382.0 mailed Sep. 27, 2024.

* cited by examiner

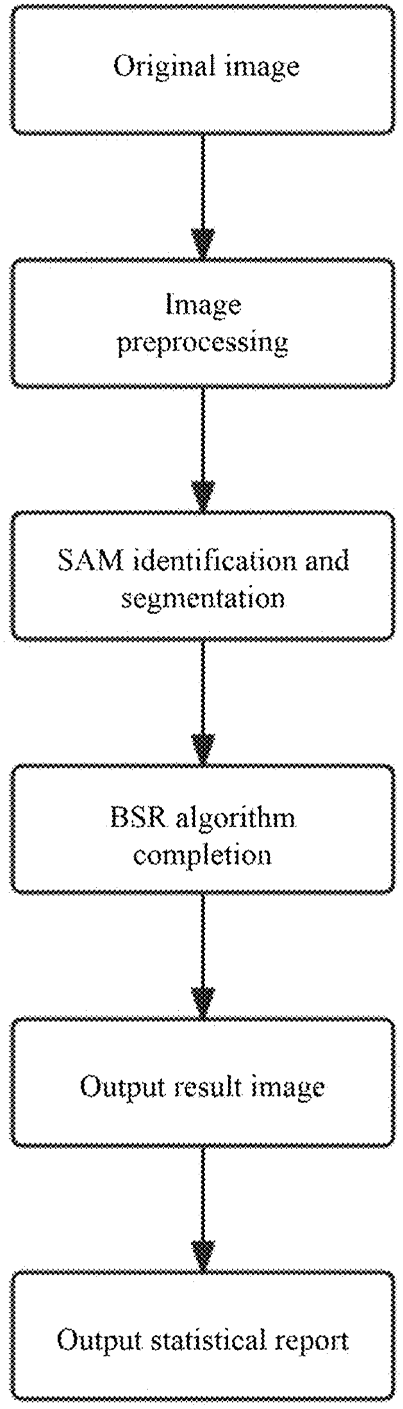
Original image
Image preprocessing
SAM identification and segmentation
BSR algorithm completion
Output result image
Output statistical report

MULTIPHASE FLOW DISPERSED PHASE IDENTIFICATION AND COMPLETION METHOD BASED ON A SAM NEURAL NETWORK

CROSS-REFERENCE TO RELATED APPLICATION(S)

This application claims priority to Chinese Patent Application No. 202410573382.0 filed May 10, 2024, the disclosure of which is incorporated herein by reference in its entirety.

TECHNICAL FIELD

The present disclosure relates to the field of multiphase flow dispersed phase image processing, for example, a multiphase flow dispersed phase identification and completion method based on a SAM neural network.

BACKGROUND

Image processing and analysis of a multiphase flow dispersed phase are crucial in industrial applications, especially in the petroleum and chemical industries. Typical applications in these industries include, but are not limited to, performance evaluation of gas-liquid reactors, fluid dynamics research, and process monitoring and optimization. Traditional image processing methods such as high-speed photography combined with edge detection, watershed algorithms, and threshold segmentation, although effective in some applications, exhibit significant limitations when processing images in complex situations such as highly overlapped bubbles, blurred edges, and uneven lighting. These traditional methods often require extensive manual intervention and parameter adjustments, being impractical in rapidly changing industrial environments.

By contrast, deep learning-based methods, particularly convolutional neural networks (CNNs), show outstanding performance in the field of image processing. These methods can learn and identify complex image patterns and are more robust to noise and lighting variations. However, they still have limitations in terms of data requirements, dependencies on specific tasks, and computational resource consumption.

Moreover, these existing methods often require retraining or significant adjustments when faced with unseen data types or new tasks; and face difficulty when reconstructing bubbles of complex shapes, especially when bubble shapes are irregular or affected by neighboring objects.

With the advancement of AI technologies, particularly the development of general artificial intelligence, foundational models have become keys in solving these problems. A foundational model is a large artificial intelligence neural network pre-trained on a large-scale dataset and has a strong generalization capability, enabling robust zero-shot generalization to adapt to a wide range of downstream tasks. The segment anything model (SAM), launched by Meta AI Research, is an advanced foundational model that shows outstanding performance in image segmentation tasks, effectively processing images without any human intervention. Therefore, the SAM model holds great promise in image processing of a multiphase flow dispersed phase.

SUMMARY

The present disclosure provides a multiphase flow dispersed phase identification and completion method based on a SAM neural network. The method improves the precision of image analysis, improves the processing efficiency and the automation degree, and reduces the dependence on large-scale labeled data and computing resources. The method is adaptable to diverse experimental conditions and image types and applicable to precise identification and effective reconstruction of bubbles of complex shapes.

The present disclosure provides a multiphase flow dispersed phase identification and completion method based on a SAM neural network.

The method includes preprocessing an image to filter out noise and a non-key frequency component; identifying and segmenting the preprocessed image by using a SAM neural network to obtain a segmentation mask; post-processing the segmentation mask to output a precise bubble mask; and reconstructing the shape of a bubble by using a bubble reconstruction algorithm.

In a preferred solution of the present disclosure, preprocessing the image includes transforming the image from a spatial domain to a frequency domain; filtering out the noise and the non-key frequency component in the frequency domain; and transforming the image from the frequency domain back to the spatial domain.

In a preferred solution of the present disclosure, the image is transformed from the spatial domain to the frequency domain by using a fast Fourier transform.

Preferably, a formula, used for transforming the image from the spatial domain to the frequency domain by using the fast Fourier transform, is:

$$I(f_x, f_y) = FFT(I(x, y)).$$

Here I(x,y) denotes an original image, x,y denote a pixel position on the image, and $f_x$,$f_y$ denote coordinates in the frequency domain of the image.

In a preferred solution of the present disclosure, the noise and the non-key frequency component are filtered out in frequency domain coordinates through a set threshold T.

Preferably, a formula, used for filtering out the noise and the non-key frequency component in frequency domain coordinates through a set threshold T, is:

$$I'(f_x, f_y) = \begin{cases} I(f_x, f_y) & \text{if } \sqrt{f_x^2 + f_y^2} > T \\ 0 & \text{otherwise} \end{cases}.$$

Here $I'(f_x,f_y)$ denotes an image whose noise and non-key frequency component are filtered out.

In a preferred solution of the present disclosure, the image is transformed from the frequency domain back to the spatial domain by using an inverse fast Fourier transform.

In a preferred solution of the present disclosure, identifying and segmenting the preprocessed image by using the SAM neural network includes that a SAM model receives the preprocessed image as input; the SAM model extracts features of the image by using an image encoder; the SAM model processes the inputted image by using a prompt encoder to identify and segment the bubble; and the SAM model transforms an encoded image and prompt data into the segmentation mask by using a mask decoder.

In a preferred solution of the present disclosure, the post-processing of the image includes identifying and excluding a mask that represents a background and that is too large and a mask having an extremely low fill rate; and removing a mask that causes under-segmentation and a mask nested inside another mask.

In a preferred solution of the present disclosure, the bubble reconstruction algorithm includes extracting boundary contour points from the precise bubble mask; extracting a relationship between a target and the surrounding by using global information, identifying a shared boundary, determining boundary attribution, and mapping an identified bubble contour into a polar coordinate system; and completing the overall contour of the bubble by fitting a missing part by using a cubic spline curve.

In a preferred solution of the present disclosure, the boundary contour points are extracted from the bubble mask by using an edge extraction algorithm.

In a preferred solution of the present disclosure, identifying the shared boundary includes identifying the shared boundary between an occluding bubble and an occluded bubble.

Preferably, the shared boundary is determined based on an analysis of a mask intersection between the occluding bubble and the occluded bubble.

Preferably, the boundary contour points of the shared boundary are attributed to the occluding bubble and removed from a mask of the occluded bubble.

BRIEF DESCRIPTION OF DRAWINGS

FIG. 1 is a flowchart of a multiphase flow dispersed phase identification and completion method based on a SAM neural network according to an embodiment of this application.

The present disclosure is described in detail hereinafter. However, the following examples are simplified illustrations of the present disclosure and do not represent or limit the scope of protection of the claims of the present disclosure. The scope of protection of the present disclosure is defined by the claims.

DETAILED DESCRIPTION

The solutions of the present disclosure are described hereinafter through embodiments.

An embodiment of this application provides a multiphase flow dispersed phase identification and completion method based on a SAM neural network. FIG. 1 is a flowchart of the method. The method includes preprocessing an image to filter out noise and a non-key frequency component; identifying and segmenting the preprocessed image by using a SAM neural network to obtain a segmentation mask; post-processing the segmentation mask to output a precise bubble mask; and reconstructing the shape of a bubble by using a bubble reconstruction algorithm, e.g., reconstructing the shape of a bubble in the segmented image by using the bubble reconstruction algorithm.

The present disclosure uses a SAM neural network in combination with a frequency domain method to remove interference factors in an image and improve the definition of the image; performs effective image segmentation by using a strong generalization capability of the SAM; performs post-processing by using a segmentation mask; identifies and excludes a mask that represents a background and that is too large and a mask having an extremely low fill rate; removes a mask that causes under-segmentation and a mask nested inside another mask; and finally outputs a precise bubble mask. Additionally, the present disclosure introduces an innovative bubble completion algorithm Bubble Shape Reconstruction (BSR) to improve the reconstruction precision of a bubble.

In the present disclosure, the SAM model used is an advanced image segmentation technology based on deep learning. The core advantage of the SAM model is that the SAM model can adapt to various image types and segmentation tasks, even scenes that have not been encountered during training.

In an embodiment of the present disclosure, before the image is preprocessed, image acquisition and preparation are required.

In a multiphase flow experimental environment, a high-resolution camera with a high dynamic range and optimized optical properties is used for image acquisition. In an embodiment of the present disclosure, a camera capable of capturing at least 1080p resolution is selected to ensure that the image quality satisfies the requirements for subsequent processing.

In an embodiment of the present disclosure, the exposure time, ISO setting, and focal length of the camera are adjusted according to the requirements of the experiment. The values of these parameters are not limited herein. As a distance, in a fast-flowing scene, a shorter exposure time is used to reduce a motion blur.

In an embodiment of the present disclosure, during image acquisition, it is ensured that various possible operating conditions are covered, such as different ventilation rates, different types of liquid media (considering differences in viscosity and surface tension), and different rotation speeds. This can ensure that enough diversified data is obtained so that the analysis result is more universal.

In an embodiment of the present disclosure, the acquired image is preprocessed.

In an embodiment of the present disclosure, enhancement processing is performed on the image before the image is transformed from the spatial domain to the frequency domain.

In an embodiment of the present disclosure, a Fast Fourier Transform (FFT) is used to transform the captured image from the spatial domain to the frequency domain. This transformation is achieved by representing the image as a combination of waveforms of different frequencies. Each waveform represents a different feature of the image. The key frequency components in the image can be revealed by FFT, being crucial for subsequent filtering and feature extraction.

In an embodiment of the present disclosure, the image is filtered in the frequency domain.

In an embodiment of the present disclosure, the filtering processing includes removing image noise and non-key frequency components to highlight important features of the image, such as the edge and the shape of the bubble. The low-frequency component is usually related to the background and the smooth region of the image while the high-frequency component is related to the details of the image.

In an embodiment of the present disclosure, noise and non-key frequency components are filtered out through an appropriate set threshold T.

In the present disclosure, the image preprocessing can enhance the key features in the image so that the edge and the shape of the bubble are more visually prominent.

In an embodiment of the present disclosure, the image is transformed from the frequency domain back to the spatial domain by using an inverse FFT, ensuring that the effect of image enhancement and filtering can be reflected in the final image: $I_{processed}(x,y)=IFFT(I'(f_x,f_y))$.

In the present disclosure, the inverse FFT makes the processed image visually clearer and provides a more accurate information basis for subsequent image analysis and processing.

In an embodiment of the present disclosure, the SAM model can identify and segment the image by learning a large amount of image data.

In an embodiment of the present disclosure, the SAM model accurately identifies bubbles in the image by processing the input image through its flexible prompt encoder.

The SAM model has the ability to handle multiple types of prompts, such as points, boxes, text, and full automation. In an embodiment of the present disclosure, a fully-automatic segmentation mode is used to identify and segment the multiphase flow dispersed phase.

In an embodiment of the present disclosure, a SAM model mask decoder is responsible for transforming the encoded image and prompt data into a final segmentation mask.

In an embodiment of the present disclosure, post-processing is performed on the segmentation mask.

In an embodiment of the present disclosure, the post-processing includes identifying and excluding a mask that represents a background and that is too large and a mask having an extremely low fill rate; removing a mask that causes under-segmentation and a mask nested inside another mask; and finally outputs a precise bubble mask.

In the present disclosure, the SAM model, combined with the preprocessing and post-processing steps, can precisely distinguish bubbles from other elements in the image and generate detailed bubble contours. The key advantage of the SAM model is the adaptability and flexibility to different images and prompts. Even under complex or challenging image conditions, the SAM model can effectively process and identify the bubbles.

In the present disclosure, the SAM neural network used in the preceding steps can effectively process and analyze the preprocessed image and, plus post-processing steps, can accurately identify and segment bubbles in the image. This efficient and precise image processing capability provides strong support for subsequent bubble behavior analysis and multiphase flow research.

In a multiphase flow analysis, correctly identifying and reconstructing the shape of the bubble is critical for accurate understanding of fluid dynamics. Although the preceding method can effectively identify and segment the bubble in the image, in some cases, the generated mask may require further processing to restore the true shape of the bubble due to occlusion or the complex shape of the bubble, so this application introduces a bubble shape reconstruction (BSR) algorithm.

In practical application, the bubble may be partially occluded or present an irregular shape due to the influence of fluid dynamics, making the contour of the bubble directly obtained from the image segmentation incomplete or inaccurate. In an embodiment of the present disclosure, an edge extraction algorithm is used to extract the required boundary contour points from the specified mask.

In an embodiment of the present disclosure, a method for identifying the shared boundary between the occluding bubble and the occluded bubble is as follows: It is assumed that there are two bubbles $B_1$ and $B_2$, where $B_1$ partially occludes $B_2$, and the shared boundary of the two bubbles is defined as $C_{12}$. This step is achieved by analyzing the mask intersection where two bubbles overlap. Mathematically, the intersection set $C_{12}$ is calculated as follows:

$$C_{12} = \partial B_1 \cap \partial B_2.$$

Here $\partial B_1$ and $\partial B_2$ represent the boundary of $B_1$ and the boundary of $B_2$ respectively.

In an embodiment of the present disclosure, after $C_{12}$ is identified, the attribution of the boundary is determined. The shared boundary is considered to belong to the occluding bubble. Therefore, $C_{12}$ is retained as part of the boundary of $B_1$ and removed from the dataset of $B_2$.

In the present disclosure, the cubic spline interpolation method is a method that performs interpolation using a series of cubic polynomials over various intervals. We use cubic spline fitting to continuously and smoothly reconstruct the bubble contours.

In an embodiment of the present disclosure, a spline function is constructed to fit the contours of the occluded intervals. To ensure that the curve is smooth at the junction points, under the constraint of continuous function values, the spline function of adjacent nodes must also satisfy the following constraint: The first and second derivatives at the endpoints must be continuous.

Each inner node $\theta_i$ of i=1, 2, . . . , N−1 satisfies:

$$\begin{cases} S_i'(\theta_i) = S_{i+1}'(\theta_i) \\ S_i''(\theta_i) = S_{i+1}''(\theta_i) \end{cases}.$$

Moreover, since the spline curve does not need to pass precisely through all the sample data points, but allows for a certain error to obtain a smoother curve, the following optimization objective function is used in the implementation:

$$E = \sum_{i=1}^{N} (r_i - S(\theta_i))^2 + \lambda \int [S''(\theta)]^2 dx.$$

Here $r_i$ and $\theta_i$ denote polar coordinates of the curve, $r_i$ denotes the radial distance from the pole to a point in the polar coordinates, $\theta_i$ denotes the angle between the line connecting the point to the pole and the positive direction of the x-axis, and $\lambda$ denotes a smoothing parameter that controls the smoothness of fitting. The second derivative value of the spline function $S(\theta)$ is included in the optimization function.

So far, the contour reconstruction problem can be equivalent to an optimization problem of the optimization function. The solution at which the optimization function attains its minimum value is the polar coordinate representation of the desired reconstructed contour. By transforming this polar coordinate representation back to the Cartesian coordinate system, the reconstruction of the missing contour is completed.

In the present disclosure, the BSR algorithm is very important for the reconstruction and completion of the shape of the bubble because the bubble is deformed to have a very complex shape due to a hydrodynamic action. Therefore, the BSR algorithm is not only applicable to not only circular or elliptical bubbles, but also bubbles of more complex shapes, such as twisted or elongated bubbles.

In the present disclosure, the BSR algorithm demonstrates excellent adaptability to complex environments. In a real multiphase flow, a bubble may be surrounded by other bubbles, solid particles, or fluid structures. The BSR algorithm can effectively operate under these complex conditions, accurately reconstructing the shape of the bubble. This capability is critical for analyzing and understanding gas-liquid interactions in the multiphase flow because the shape and size of the bubble directly influence mass transfer and dynamic behaviors between the gas and liquid.

In an embodiment of the present disclosure, detailed analysis of the image data processed by the SAM model and reconstructed by the BSR algorithm is performed. This analysis includes quantifying key parameters such as bubble size, shape, and distribution and analyzing how these parameters change with experimental conditions.

In another embodiment of the present disclosure, the accuracy and reliability of the method of the present disclosure are verified by comparing experimental data with model prediction results. The generalization ability and adaptability of the method are evaluated in repeated experiments under different operating conditions to ensure that the proposed method can effectively work under various flow conditions.

To better illustrate the present disclosure and facilitate understanding of the solutions of the present disclosure, the following describes typical but non-limiting embodiments of the present disclosure:

EMBODIMENT

This embodiment provides a multiphase flow dispersed phase identification and completion method based on a SAM neural network. The method includes the following steps:

(1) Image Acquisition

A 1080P resolution camera with high dynamic range and optimized optical characteristics is used for image acquisition. The exposure time, ISO settings, and focal length of the camera are adjusted based on the fluid properties.

(2) Image Preprocessing

① The image is transformed from the spatial domain to the frequency domain by using a fast Fourier transform by using the formula:

$$I(f_x, f_y) = FFT(I(x, y)).$$

Here I(x,y) denotes an original image, x,y denote a pixel position on the image, and $f_x$,$f_y$ denote coordinates in the frequency domain of the image.

② The noise and the non-key frequency component are filtered out in frequency domain coordinates through a set threshold T by using the following formula:

$$I'(f_x, f_y) = \begin{cases} I(f_x, f_y) & \text{if } \sqrt{f_x^2 + f_y^2} > T \\ 0 & \text{otherwise} \end{cases}.$$

Here $I'(f_x,f_y)$ denotes an image whose noise and non-key frequency component are filtered out.

③ The image is transformed from the frequency domain back to the spatial domain by using an inverse fast Fourier transform to ensure that the effect of image enhancement and filtering can be reflected in the final image: $I_{processed}(x,y)=IFFT(I'(f_x,f_y))$.

(3) Identification and Segmentation of the Preprocessed Image by Using a SAM Neural Network A SAM model receives the preprocessed image as input; the SAM model extracts features of the image by using an image encoder; the SAM model processes the inputted image by using a prompt encoder to identify and segment the bubble; and the SAM model transforms the encoded image and prompt data into the segmentation mask by using a mask decoder.

The segmentation mask is post-processed to output a precise bubble mask. The post-processing of the image includes identifying and excluding a mask that represents a background and that is too large and a mask having an extremely low fill rate; and removing a mask that causes under-segmentation and a mask nested inside another mask.

(4) Reconstruction of the Shape of the Bubble by Using a Bubble Reconstruction Algorithm Boundary contour points are extracted from the precise bubble mask by using an edge extraction algorithm.

A relationship between a target and the surrounding are extracted by using global information. A shared boundary is identified. The boundary attribution is determined. An identified bubble contour is mapped into a polar coordinate system.

It is assumed that there are two bubbles $B_1$ and $B_2$, where $B_1$ partially occludes $B_2$, and the shared boundary of the two bubbles is defined as $C_{12}$. The shared boundary is determined by analyzing the mask intersection where two bubbles overlap. The intersection set $C_{12}$ is calculated as follows:

$$C_{12} = \partial B_1 \cap \partial B_2.$$

Here $\partial B_1$ and $\partial B_2$ represent the boundary of $B_1$ and the boundary of $B_2$ respectively.

After $C_{12}$ is identified, the attribution of the boundary is determined. The shared boundary is considered to belong to the occluding bubble. Therefore, $C_{12}$ is retained as part of the boundary of $B_1$ and removed from the dataset of $B_2$.

Cubic spline fitting is used to continuously and smoothly reconstruct the bubble contours.

A spline function is constructed to fit the contours of the occluded intervals. To ensure that the curve is smooth at the junction points, under the constraint of continuous function values, the spline function of adjacent nodes also needs to satisfy the following constraint: The first and second derivatives at the endpoints must be continuous.

Each inner node $\theta_i$ of i=1, 2, . . . , N−1 satisfies:

$$\begin{cases} S_i'(\theta_i) = S_{i+1}'(\theta_i) \\ S_i''(\theta_i) = S_{i+1}''(\theta_i) \end{cases}.$$

Moreover, since the spline curve does not need to pass precisely through all the sample data points, but allows for a certain error to obtain a smoother curve, the following optimization objective function is used in the implementation:

$$E = \sum_{i=1}^{N} (r_i - S(\theta_i))^2 + \lambda \int [S''(\theta)]^2 dx.$$

So far, the contour reconstruction problem can be equivalent to an optimization problem of the optimization function. The solution at which the optimization function attains its minimum value is the polar coordinate representation of the desired reconstructed contour. By transforming this polar coordinate representation back to the Cartesian coordinate system, the reconstruction of the missing contour is completed.

Example 1

This example uses the multiphase flow dispersed phase identification and completion method based on a SAM neural network according to the preceding embodiment to identify and complete a multiphase flow dispersed phase.

Here the continuous phase of the multiphase flow is a water phase, and the dispersed phase of the multiphase flow is air, with an aeration rate of 0.18 L/min.

Example 2

This example uses the multiphase flow dispersed phase identification and completion method based on a SAM neural network according to the preceding embodiment to identify and complete a multiphase flow dispersed phase.

Here the dispersed phase of the multiphase flow is the same as that of example 1, with an aeration rate of 0.27 L/min.

Example 3

This example uses the multiphase flow dispersed phase identification and completion method based on a SAM neural network according to the preceding embodiment to identify and complete a multiphase flow dispersed phase.

Here the dispersed phase of the multiphase flow is the same as that of example 1, with an aeration rate of 0.63 L/min.

Example 4

This example uses the multiphase flow dispersed phase identification and completion method based on a SAM neural network according to the preceding embodiment to identify and complete a multiphase flow dispersed phase.

Here the continuous phase of the multiphase flow is a water phase, and the dispersed phase of the multiphase flow consists of air and solid particles.

The multiphase flow dispersed phase identification and completion method based on a SAM neural network has good identification and completion performance. The method performs well in different multiphase flow systems. The method is adaptable to diverse experimental conditions and image types, applicable to precise identification and effective reconstruction of bubbles of complex shapes, and suitable for the measurement and analysis of a multiphase flow system.

To solve the problems existing in the related art, the present disclosure provides a multiphase flow dispersed phase identification and completion method based on a SAM neural network. The method improves the precision of image analysis, improves the processing efficiency and the automation degree, and reduces the dependence on large-scale labeled data and computing resources. The method is adaptable to diverse experimental conditions and image types and applicable to accurate identification and effective reconstruction of bubbles of complex shapes.

Compared with the related art, the present disclosure has at least the following advantageous effects:

1. Improved analysis precision: Through advanced image preprocessing and deep learning models, this method achieves more precise identification and analysis of complex bubble flow images. This improvement in precision, particularly precision in the identification and quantification of bubble shapes, provides significant support for multiphase flow system research and process monitoring in industries such as petroleum and chemical engineering.
2. Enhanced processing efficiency and automation: Compared with traditional image processing methods, the present disclosure significantly reduces the need for manual intervention and parameter adjustments and achieves a higher degree of automation and processing efficiency. This is especially critical in dynamically changing multiphase flow system environments.
3. Reduced dependence on large-scale labeled data and computational resources: Due to the powerful generalization capability of the SAM model, the present disclosure reduces dependence on extensive labeled data and is more efficient than traditional deep learning methods, thereby lowering computational resource consumption.
4. Stronger generalization capability: The present disclosure is adaptable to diverse experimental conditions and image types and demonstrates excellent performance even in the case of unseen data and new tasks. This is challenging to achieve in traditional methods.
5. Effective reconstruction of bubbles having complex shapes: The BSR algorithm is particularly suitable for reconstructing bubbles that are occluded or have irregular shapes, providing a more accurate and effective method for bubble shape reconstruction. This is of great significance for advancing the understanding of bubble dynamics and bubble control process optimization.

The applicants have stated that although the detailed structure characteristics of the present disclosure are described through the preceding embodiments, the present disclosure is not limited to the preceding detailed structure characteristics, which means that implementation of the present disclosure does not necessarily depend on the preceding detailed structure characteristics. It is apparent to those skilled in the art that any improvements made to the present disclosure, equivalent replacements of units selected in the present disclosure and addition of assistant units thereof, and selections of methods all fall within the protection scope and the disclosed scope of the present disclosure.

Though the preferred embodiments of the present disclosure have been described above in detail, the present disclosure is not limited to the preceding-described embodiments, and various simple modifications can be made to the solutions of the present disclosure without departing from the scope of the present disclosure. These simple modifications are all within the scope of the present disclosure.

Additionally, it is to be noted that if not in collision, the features described in the preceding embodiments may be combined in any suitable manner. To avoid unnecessary repetition, the present disclosure does not specify any of various possible combination manners.

Additionally, various different embodiments of the present disclosure can be combined in any manner. These combinations should also be considered as part of the disclosed content of the present disclosure as long as such combinations do not deviate from the spirit of the present disclosure.

What is claimed is:

1. A multiphase flow dispersed phase identification and completion method based on a SAM neural network, comprising the following steps:

preprocessing an image to filter out noise and a non-key frequency component;

identifying and segmenting the preprocessed image by using a SAM neural network to obtain a segmentation mask;

post-processing the segmentation mask to output a precise bubble mask; and reconstructing a shape of a bubble by using a bubble reconstruction algorithm;

wherein the post-processing of the image comprises:

identifying and excluding a mask that represents a background and that is deficient in size and a mask having a deficiency in fill rate; and removing a mask that causes under-segmentation and a mask nested inside another mask; and wherein the bubble reconstruction algorithm comprises:

extracting boundary contour points from the precise bubble mask;

extracting a relationship between a target and a surrounding by using global information, identifying a shared boundary, determining boundary attribution, and mapping an identified bubble contour into a polar coordinate system; and completing an overall contour of the bubble by fitting a missing part by using a cubic spline curve;

wherein the boundary contour points are extracted from the bubble mask by using an edge extraction algorithm;

wherein identifying the shared boundary includes identifying the shared boundary between an occluding bubble and an occluded bubble;

wherein the shared boundary is determined based on an analysis of a mask intersection between the occluding bubble and the occluded bubble; and wherein the boundary contour points of the shared boundary are attributed to the occluding bubble and removed from a mask of the occluded bubble.

2. The method of claim 1, wherein preprocessing the image comprises:

transforming the image from a spatial domain to a frequency domain;

filtering out the noise and the non-key frequency component in the frequency domain; and transforming the image from the frequency domain back to the spatial domain.

3. The method of claim 2, wherein the image is transformed from the spatial domain to the frequency domain by using a fast Fourier transform; and wherein a formula, used for transforming the image from the spatial domain to the frequency domain by using the fast Fourier transform, is:

$$I(f_x, f_y) = FFT(I(x, y)).$$

wherein I(x,y) denotes an original image, x, y denote a pixel position on the image, and $f_x$, $f_y$ denote coordinates in the frequency domain of the image.

4. The method of claim 3, wherein the noise and the non-key frequency component are filtered out in frequency domain coordinates through a set threshold T; and wherein a formula, used for filtering out the noise and the non-key frequency component in frequency domain coordinates through the set threshold T, is:

$$I'(f_x, f_y) = \begin{cases} I(f_x, f_y) & \text{if } \sqrt{f_x^2 + f_y^2} > T \\ 0 & \text{otherwise} \end{cases},$$

wherein $I'(f_x, f_y)$ denotes an image whose noise and non-key frequency component are filtered out.

5. The method of claim 2, wherein the image is transformed from the frequency domain back to the spatial domain by using an inverse fast Fourier transform.

6. The method of claim 1, wherein identifying and segmenting the preprocessed image by using the SAM neural network comprises:

receiving, by a SAM model, the preprocessed image as input;

extracting, by the SAM model, features of the image by using an image encoder;

processing, by the SAM model, the inputted image by using a prompt encoder to identify and segment the bubble; and transforming, by the SAM model, an encoded image and prompt data into the segmentation mask by using a mask decoder.

* * * * *